(12) United States Patent
Lee et al.

(10) Patent No.: US 11,591,498 B2
(45) Date of Patent: Feb. 28, 2023

(54) FLEXIBLE FILM

(71) Applicant: LG CHEM, LTD., Seoul (KR)

(72) Inventors: Jin Kuk Lee, Daejeon (KR); Jin Young Park, Daejeon (KR); Soon Hwa Jung, Daejeon (KR); Yeong Rae Chang, Daejeon (KR); Jung Hyun Seo, Daejeon (KR); Hye Min Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 19 days.

(21) Appl. No.: 16/482,419

(22) PCT Filed: Sep. 19, 2018

(86) PCT No.: PCT/KR2018/011060
§ 371 (c)(1),
(2) Date: Jul. 31, 2019

(87) PCT Pub. No.: WO2019/066368
PCT Pub. Date: Apr. 4, 2019

(65) Prior Publication Data
US 2020/0010736 A1 Jan. 9, 2020

(30) Foreign Application Priority Data

Sep. 28, 2017 (KR) .................. 10-2017-0126592
Sep. 18, 2018 (KR) .................. 10-2018-0111632

(51) Int. Cl.
*C09J 7/50* (2018.01)
*C09J 7/25* (2018.01)
(Continued)

(52) U.S. Cl.
CPC ............... *C09J 7/50* (2018.01); *B32B 27/30* (2013.01); *C08J 7/042* (2013.01); *C09J 7/25* (2018.01);
(Continued)

(58) Field of Classification Search
CPC ....... C09J 7/50; C09J 7/25; C09J 11/04; C09J 2301/414; C09J 2433/003; C09J 2475/003;
(Continued)

(56) References Cited

U.S. PATENT DOCUMENTS 9,909,026 B2    3/2018  Kang et al.
2014/0349130 A1 11/2014 Petcavich et al.
(Continued)

FOREIGN PATENT DOCUMENTS

CN    104024993 A    9/2014
CN    104487494 A    4/2015
(Continued)

OTHER PUBLICATIONS

International Search Report issued for International Application No. PCT/KR2018/011060 dated Jan. 9, 2019, 11 pages.

*Primary Examiner* — Alicia J Sawdon
*Assistant Examiner* — Laura B Figg
(74) *Attorney, Agent, or Firm* — Rothwell, Figg, Ernst & Manbeck, P.C.

(57) ABSTRACT

The present invention relates to a flexible film, more specifically, to a flexible film that not only exhibits high hardness, but also has excellent flexibility. According to the flexible film of the present invention, flexibility, bendability, high hardness, scratch resistance, and high transparency are exhibited, and there is no concern for damage of the film even when bended repeatedly or folded for a long time, and thus, it may be usefully applied for the front panels, display parts of bendable, flexible, rollable, or foldable mobile devices, display devices, various instrument panels, and the like.

12 Claims, 1 Drawing Sheet

(51) Int. Cl.
   *C09J 11/04*   (2006.01)
   *B32B 27/30*   (2006.01)
   *C08J 7/04*    (2020.01)

(52) U.S. Cl.
   CPC .......... *C09J 11/04* (2013.01); *B32B 2250/02* (2013.01); *B32B 2250/24* (2013.01); *C09J 2301/414* (2020.08); *C09J 2433/003* (2013.01); *C09J 2475/003* (2013.01); *C09J 2479/086* (2013.01); *Y10T 428/2495* (2015.01)

(58) Field of Classification Search
   CPC ................ C09J 2479/086; B32B 27/30; B32B 2250/02; B32B 2250/24; C08J 7/042; C08J 11/04; C08J 2301/414; Y10T 428/2495
   See application file for complete search history.

(56) References Cited

U.S. PATENT DOCUMENTS

| | | | |
|---|---|---|---|
| 2015/0132552 A1 | 5/2015 | Kang et al. | |
| 2015/0140279 A1* | 5/2015 | Kang | C09D 4/00 428/174 |
| 2015/0225598 A1 | 8/2015 | Kang et al. | |
| 2015/0252212 A1 | 9/2015 | Kang et al. | |
| 2016/0282902 A1* | 9/2016 | Kang | B32B 27/08 |
| 2016/0288479 A1* | 10/2016 | Shuey | C08L 35/02 |
| 2018/0201000 A1 | 7/2018 | Kim et al. | |
| 2018/0201002 A1 | 7/2018 | Kim et al. | |

FOREIGN PATENT DOCUMENTS

| | | |
|---|---|---|
| CN | 104520387 A | 4/2015 |
| JP | 2010-085760 A | 4/2010 |
| JP | 2012-030532 A | 2/2012 |
| JP | 2015-523202 A | 8/2015 |
| JP | 2015-527233 A | 9/2015 |
| JP | 2015-533675 A | 11/2015 |
| JP | 2017-033031 A | 2/2017 |
| KR | 10-2010-0041992 A | 4/2010 |
| KR | 10-2010-0055160 A | 5/2010 |
| KR | 10-2010-0132786 A | 12/2010 |
| KR | 10-1168073 B1 | 7/2012 |
| KR | 10-2013-0135156 A | 12/2013 |
| KR | 10-2014-0027023 A | 3/2014 |
| KR | 10-2015-0058067 A | 5/2015 |
| KR | 10-2016-0058319 A | 5/2016 |
| KR | 10-2017-0016297 A | 2/2017 |
| KR | 10-2017-0016299 A | 2/2017 |
| KR | 10-2017-0037384 A | 4/2017 |
| WO | 2017-023119 A1 | 2/2017 |

* cited by examiner

■ second coating layer
▓ support substrate
▒ first coating layer

— first coating layer
— support substrate
— second coating layer
— adhesive layer
— polyimide film

FLEXIBLE FILM

CROSS-REFERENCE TO RELATED APPLICATION

This application is a 35 U.S.C. § 371 National Phase Entry Application from PCT/KR2018/011060, filed on Sep. 19, 2018, and designating the United States, which claims the benefit of Korean Patent Application No. 10-2017-0126592 filed on Sep. 28, 2017 and Korean Patent Application No. 10-2018-0111632 filed on Sep. 18, 2018 with the Korean Intellectual Property Office, the disclosures of which are herein incorporated by reference in their entirety.

BACKGROUND OF THE INVENTION

(a) Field of the Invention

The present invention relates to a flexible film. More specifically, the present invention relates to a flexible film that not only exhibits high hardness, but also has excellent flexibility and impact resistance.

(b) Description of the Related Art

With the recent development of mobile devices such as a smart phone, a table PC, and the like, a substrate for a display is required to become thin and slim. For the display window or front panel of such a mobile device, materials having excellent mechanical properties such as glass or reinforced glass are generally used. However, glass becomes a cause for the heavy weight of a mobile device due to its own weight, and has a problem of damage by external impact.

Thus, plastic resin is being studied as material that can replace glass. Since a plastic resin film is light-weighted without a concern of being broken, it is suitable for a tendency seeking lighter mobile devices. Particularly, in order to achieve a film having high hardness and abrasion resistance, a method of coating a hard coating layer consisting of plastic resin on a support substrate is being suggested.

As a method for improving the surface hardness of a hard coating layer, a method of increasing the thickness of a hard coating layer may be considered. In order to secure the surface hardness to a degree sufficient for replacing glass, it is required to realize a certain thickness of a hard coating layer. However, as the thickness of a hard coating layer is increased, although the surface hardness may increase, the generation of wrinkle or curl may increase by cure shrinkage of the hard coating layer, and simultaneously, crack or delamination may be generated in the hard coating layer, and thus, this method is not easy to practically apply.

Korean Laid-Open Patent Publication No. 2010-0041992 discloses a plastic film composition using binder resin comprising UV-curable polyurethane acrylate-based oligomer without monomers. However, the pencil hardness of the plastic film disclosed is about 3 H, which is not sufficient for replacing the glass panel of a display.

Meanwhile, for esthetic, functional reasons, a display with a curved part, or a flexibly bended display is recently receiving attentions, and such a tendency is noticeable in mobile devices such as a smart phone, or a tablet PC. However, since glass is not suitable for use as a cover plate for protecting such a flexible display, it is required to be replaced with plastic resin, and the like. However, there is a difficulty in the manufacture of a film exhibiting high hardness of a glass level and having sufficient flexibility and impact resistance.

SUMMARY OF THE INVENTION

It is an object of the present invention to provide a flexible film that not only exhibits high hardness, but also has excellent flexibility and impact resistance.

In order to solve the above problem, the present invention provides a flexible film comprising a support substrate;

a first coating layer on one side of the support substrate, comprising a first crosslinked copolymer in which one or more kinds of different tri- to hexa-functional acrylate-based binders are crosslinked, and inorganic fine particles; and a second coating layer on an opposite side of the support substrate, comprising a second crosslinked copolymer in which one or more kinds of different tri- to hexa-functional acrylate-based binders, a difunctional acrylate-based binder, and di- to tetra-functional urethane acrylate-based binder are crosslinked, wherein a modulus of elasticity of the second coating layer, as measured according to ASTM D882 while the second coating layer is delaminated from the support substrate, is 400 to 650 MPa, a thickness of the first coating layer is 20 to 70 μm, and a thickness of the second coating layer is 20 to 150 μm, and a ratio of the thicknesses of the first coating layer and the second coating layer is 1:1 to 1:5.

According to the flexible film of the present invention, flexibility, bendability, high hardness, scratch resistance, and high transparency are exhibited, and there is no concern for damage of the film even when bended repeatedly or folded for a long time, and thus, it may be usefully applied for the front panels, display parts of bendable, flexible, rollable, or foldable mobile devices, display devices, various instrument panels, and the like.

DETAILED DESCRIPTION OF THE EMBODIMENTS

Figure 1:
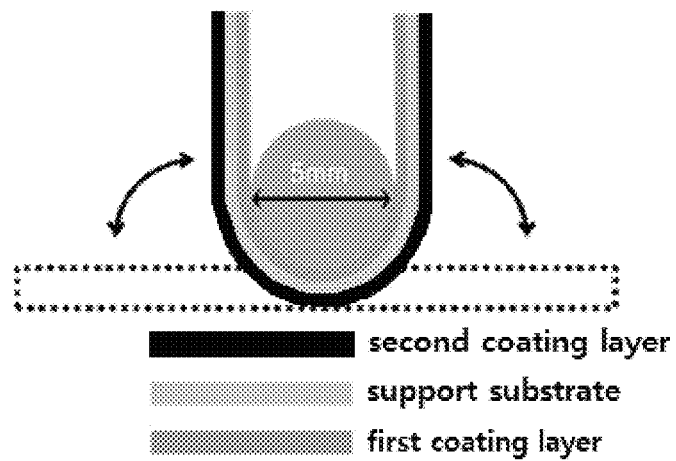
FIG. 1 schematically shows a method of conducting a dynamic folding test for a film according to one embodiment of the present invention.

The flexible film of the present invention comprises: a support substrate; a first coating layer on one side of the support substrate, comprising a first crosslinked copolymer in which one or more kinds of different tri- to hexa-functional acrylate-based binders are crosslinked, and inorganic fine particles; and a second coating layer on an opposite side of the support substrate, comprising a second crosslinked copolymer in which one or more kinds of different tri- to hexa-functional acrylate-based binders, a difunctional acrylate-based binder, and di- to tetra-functional urethane acrylate-based binder are crosslinked, wherein a modulus of elasticity of the second coating layer, as measured according to ASTM D882 while the second coating layer is delaminated from the support substrate, is 400 to 650 MPa, a thickness of the first coating layer is 20 to 70 μm, and a thickness of the second coating layer is 20 to 150 µm, and a ratio of the thicknesses of the first coating layer and the second coating layer is 1:1 to 1:5.

As used herein, terms "a first", "a second" and the like are used to explain various constructional elements, and they are used only to distinguish one constructional element from other constructional elements.

And, the terms used herein are only to explain specific embodiments, and are not intended to limit the present invention. A singular expression includes a plural expression thereof, unless it is expressly stated or obvious from the context that such is not intended. As used herein, the terms "comprise" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

Throughout the specification, the term 'acrylate-based' means acrylate, methacrylate, or any derivatives in which a substituent is introduced into acrylate or methacrylate.

Hereinafter, the flexible film of the present invention will be explained in detail.

The flexible film according to one embodiment of the present invention comprises: a support substrate; a first coating layer on one side of the support substrate, comprising a first crosslinked copolymer in which one or more kinds of different tri- to hexa-functional acrylate-based binders are crosslinked, and inorganic fine particles; and a second coating layer on an opposite side of the support substrate, comprising a second crosslinked copolymer in which one or more kinds of different tri- to hexa-functional acrylate-based binders, a difunctional acrylate-based binder, and di- to tetra-functional urethane acrylate-based binder are crosslinked, wherein a modulus of elasticity of the second coating layer, as measured according to ASTM D882 while the second coating layer is delaminated from the support substrate, is 400 to 650 MPa, a thickness of the first coating layer is 20 to 70 µm, a thickness of the second coating layer is 20 to 150 µm, and a ratio of the thicknesses of the first coating layer and the second coating layer is 1:1 to 1:5.

As used herein, the term "flexible" means a state in which the degree of flexibility is such that a crack with a length of 3 cm or more is not generated, when folding and unfolding is repeated 100,000 times in a folding equipment having a radius of curvature of 2.5 mm, and thus, the flexible film of the present invention may be applied for the cover films of bendable, flexible, rollable, or foldable displays, and the like.

In the flexible film of the present invention, the support substrate on which the coating layer is formed is not specifically limited in terms of the preparation method or material such as a drawn film or non-drawn film, and the like, as long as it has a modulus of elasticity of about 4 GPa or more, when measured according to ASTM D882, so as to secure flexibility and hardness, and has a thickness of 10 to 100 µm.

Among the requirements of the support substrate, the modulus of elasticity may be about 4 GPa or more, or 5 GPa or more, or about 5.5 GPa or more or about 6 GPa or more, and the upper limit may be about 9 GPa or less, or about 8 GPa or less. If the modulus of elasticity is less than 4 GPa, sufficient hardness may not be achieved, and if it is greater than 9 GPa, it may be difficult to form a flexible film.

And, the thickness of the support substrate may be about 10 µm or more, or about 20 µm or more, or about 30 µm or more, and the upper limit may be about 100 µm or less, or about 80 µm or less. If the thickness of the support substrate is less than 10 µm, there is a concern for fracture during the process of forming a coating layer, or generation of curl, and it may be difficult to achieve high hardness. On the contrary, if the thickness is greater than 100 µm, flexibility may decrease, and thus, it may be difficult to form a flexible film.

As such, in order to secure processability for a flexible film and balance the properties of high hardness and flexibility, the plastic film of the present invention may use a support substrate having a modulus of elasticity of 4 GPa or more and 9 GPa or less, and a thickness of 10 to 100 µm.

More specifically, according to one embodiment of the present invention, the support substrate may be a film fulfilling a modulus of elasticity and a thickness of the above explained ranges, for example, a film including polyimide (PI), polyimideamide, polyamide(PA), polyetherimide(PEI), polyethyleneterephtalate(PET), polyethylenenaphthalate (PEN), polyetheretherketon(PEEK), cyclic olefin polymer (COP), polyacrylate(PAC), polymethylmethacrylate (PMMA), or triacetylcellulose(TAC), and the like. The support substrate may have a monolayer structure, or if necessary, a multilayer structure including two or more substrates consisting of identical or different materials, but is not specifically limited.

According to one embodiment of the present invention, the support substrate may be a substrate including a multi-layer structure including polyimide(PI), polyimideamide, polyamide, or combinations of two or more of polyimide (PI), polyimideamide, polyamide.

The flexible film of the present invention comprises a first coating layer formed on one side of the support substrate, and a second coating layer formed on an opposite side of the support substrate, namely, on the opposite side of a side on which the first coating layer is formed.

First, the first coating layer comprises first crosslinked copolymer in which one or more kinds of different tri- to hexa-functional acrylate-based binders are crosslinked, and inorganic fine particles. It is preferable that the first coating layer is positioned on the top, namely, on a side close to a user, when the flexible film of the present invention is applied alone or in other devices or equipment.

Since the first coating layer comprises first crosslinked polymer in which one or more kinds of different tri- to hexa-functional acrylate-based binders are crosslinked with each other, and inorganic fine particles, it can afford high hardness property to the flexible film of the present invention.

The modulus of elasticity of the first coating layer, as measured according to ASTMD882 while the first coating layer is delaminated from the support substrate, may be 1 GPa or more, but is not specifically limited.

According to one embodiment of the present invention, as the tri- to hexa-functional acrylate-based binder, trimethylolpropane triacrylate(TMPTA), trimethylolpropane ethoxy triacrylate(TMPEOTA), glycerin propoxylated triacrylate (GPTA), pentaerythritol tetraacrylate(PETA), dipentaerythritol pentacrylate(DPEPA), or dipentaerythritol hexaacrylate (DPHA), etc. may be mentioned, but the present invention is not limited thereto.

The first crosslinked polymer is polymer obtained by the polymerization of different one or more kinds, or two or more kinds, or three or more kinds of such tri- to hexa-functional acrylate-based binders.

According to one embodiment of the present invention, the first crosslinked polymer may be obtained by the cross-linking polymerization of trimethylolpropane triacryalte (TMPTA), pentaerythritol tetraacrylate(PETA), and dipentaerythritol pentacrylate(DPEPEA).

According to one embodiment of the present invention, the weight average molecular weight(Mw) of the tri- to hexa-functional acrylate-based binder may be in the range of about 200 to about 2,000 g/mol, or about 200 to about 1,000 g/mol, or about 200 to about 600 g/mol.

And, according to one embodiment of the present invention, the acrylate equivalent weight of the tri- to hexa-functional acrylate-based binder may be in the range of about 50 to about 300 g/mol, or about 50 to about 200 g/mol, or about 50 to about 150 g/mol.

When the weight average molecular weight and the acrylate equivalent weight of the tri- to hexa-functional acrylate-based binder are respectively within the above ranges, a first coating layer with more optimized properties can be formed.

The first coating layer further comprises inorganic fine particles, in addition to the first crosslinked copolymer.

As the inorganic fine particles, inorganic fine particles having a nanoscale particle diameter, for example, nanoparticles having an average particle diameter(d50) of about 100 nm or less, or about 10 to about 100 nm, or about 10 to about 50 nm may be used. And, as the inorganic fine particles, for example, silica fine particles, aluminum oxide particles, titanium oxide particles, zirconium oxide particles, or zinc oxide particles may be used.

By including the inorganic fine particles, the hardness of the first coating layer may be further improved.

The first coating layer may comprise 40 to 80 parts by weight of the first crosslinked copolymer, and 20 to 60 parts by weight of the inorganic fine particles, based on 100 parts by weight of the first coating layer.

And, the thickness of the first coating layer may be about 20 to about 70 μm, or about 20 to about 60 μm, or about 30 to about 50 μm. If the thickness of the first coating layer is less than 20 μm, surface hardness may decrease, and if it is greater than 70 μm, the flexibility of the flexible film of the present invention may not be good, and thus, it is preferable that the thickness is in the above range.

The first coating layer having the above explained composition and thickness exhibits high hardness, thus enabling the flexible film of the present invention comprising the same to exhibit sufficient surface hardness.

The flexible film of the present invention comprises a second coating layer on an opposite side of the support substrate, namely, on the opposite side of a side on which the first coating layer is formed.

The second coating layer comprises second crosslinked copolymer in which one or more kinds of different tri- to hexa-functional acrylate-based binders, a difunctional acrylate-based binder, and di- to tetra-functional urethane acrylate-based binder are crosslinked, and affords flexibility and impact resistance to the flexible film of the present invention.

And, the second coating layer has a modulus of elasticity, when measured according to ASTM D882 while the second coating layer is delaminated form the support substrate, of about 400 to about 650 MPa, or about 450 to about 650 MPa, or about 500 to about 650 MPa, or about 500 to about 600 MPa.

If the modulus of elasticity of the second coating layer is less than 400 MPa, strong curl may be generated in a direction of the first coating layer during the preparation of a film, and if it is greater than 650 MPa, sufficient flexibility may not be provided for the whole film, and thus, cracks may be generated when folding multiple, for example 100,000 times. Thus, when the modulus of elasticity of the second coating layer is within the above range, more optimized properties in terms of hardness and flexibility may be secured.

When the second coating layer simultaneously fulfills the above explained binder composition and modulus of elasticity, the flexible film of the present invention can more effectively exhibit flexibility and dynamic folding property.

It is preferable that the second coating layer is positioned on the bottom, namely, on a side close to another device, when the flexible film of the present invention is applied alone or in another device or equipment.

The binder of the second crosslinked copolymer of the second coating layer comprises a tri- to hexa-functional acrylate-based binder, a difunctional acrylate-based binder, and a di- to tetra-functional urethane acrylate-based binder.

Among them, the tri- to hexa-functional acrylate-based binder may be identical to or different from the binder used in the first coating layer. For example, as the tri- to hexa-functional acrylate-based binder, trimethylolpropane triacrylate(TMPTA), trimethylolpropane ethoxy triacrylate (TMPEOTA), glycerin propoxylated triacrylate(GPTA), pentaerythritol tetraacrylate(PETA), dipentaerythritol pentacryalte(DPEPA), or dipentaerythritol hexaacrylate (DPHA), etc. may be mentioned, but the present invention is not limited thereto.

The second crosslinked polymer may comprise different one or more kinds, or two or more kinds, or three or more kinds of tri- to hexa-functional acryhlate-based binders. For example, according to one embodiment of the present invention, the second crosslinked polymer may comprise trimethylolpropane triacrylate(TMPTA), pentaerythritol tetraacrylate(PETA), and dipentaerythritol pentacryalte (DPEPA) as the tri- to hexa-functional acrylate-based binder, but the present invention is not limited thereto.

And, the difunctional acrylate-based binder may be triethylene glycol acrylate(TEGDA), tetraethylene glycol diacrylate(TTEGDA), tripropylene glycol diacryalte(TPGDA), dipropylene glycol diacrylate(DPGDA), polyethylene glycol diacrylate(PEGDA), ethoxylated neopentyl glycol diacrylate(NPEOGDA), propoxylated neopentyl glycol diacrylate(NPPOGDA), diethylene glycol diacrylate(DEGDA), butanediol diacrylate(BDDA) or hexanediol diacrylate (HDDA), but the present invention is not limited thereto.

According to one embodiment of the present invention, the weight average molecular weight(Mw) of the di- to tetra-functional urethane acrylate-based binder may be in the range of about 400 to about 20,000 g/mol, or about 400 to about 15,000 g/mol, or about 1,000 to about 3,000 g/mol.

And, according to one embodiment of the present invention, the di- to tetra-functional urethane acrylate-based binder may have an acrylate equivalent weight in the range of about 100 to about 10,000 g/mol, or about 200 to about 5,000 g/mol, or about 200 to about 4,000 g/mol or about 500 to about 1,000 g/mol, so as to optimize the properties of the second coating layer.

If the acrylate equivalent weight of the di- to tetra-functional urethane acrylate-based binder is too high, the hardness of the coating layer may not be sufficient, and if it is too low, although hardness may be improved, flexibility may decrease. In order to balance high hardness and flexibility, the equivalent weight of the above explained range may be preferable.

As the di- to tetra-functional urethane acrylate-based binder, TA-604AU (manufacturing company: NOF CORPORATION) or PU2100, PU210, PU3200, PU3400, PU3450 (PU series, manufacturing company: Miwon) may be used, but the present invention is not limited thereto.

The second crosslinked copolymer is polymer in which one or more kinds of the tri- to hexa-functional acrylate-based binders, the di-functional acrylate-based binder, and the di- to tetra-functional urethane acrylate-based binder are crosslinked with each other.

As such, since the second coating layer comprises polymer in which the three kinds of binders are crosslinked, it may afford excellent flexibility and impact resistance to the flexible film of the present invention.

According to one embodiment of the present invention, based on 100 parts by weight of the second crosslinked copolymer, the tri- to hexa-functional acrylate-based binders may be included in the content of 20 to 80 parts by weight, the difunctional acrylate-based binder may be included in the content of 10 to 40 parts by weight, and the di- to tetra-functional urethane acrylate-based binder may be included in the content of 10 to 70 parts by weight.

Alternatively, based on 100 parts by weight of the second crosslinked copolymer, the tri- to hexa-functional acrylate-based binders and the di- to tetra-functional urethane acrylate-based binder may be included in the content of 60 to 90 parts by weight, in combination, and the difunctional acrylate-based binder may be included in the content of 10 to 40 parts by weight.

A explained, when the second coating layer comprises second crosslinked copolymer in which one or more kinds of tri- to hexa-functional acrylate-based binders, a difunctional acrylate-based binder, and a di- to tetra-functional urethane acrylate-based binder are crosslinked with each other, the flexible film of the present invention can achieve sufficient flexibility and impact resistance.

And, the thickness of the second coating layer may be about 20 to about 150 μm, or about 30 to about 120 μm, or about 30 to about 100 μm.

When the composition, thickness and modulus of elasticity of the second coating layer are within the above explained ranges, particularly due to high durability to bending, rolling or folding, very excellent folding properties with little concern for damage of a film even when repeatedly bended or folded for a long time, can be secured.

In addition, in the flexible film of the present invention, the ratio of the thicknesses of the first coating layer and the second coating layer may be in the range of about 1:1 to about 1:5, or about 1:1 to about 1:4, or about 1:1 to about 1:3. If the ratio of the thicknesses of the first coating layer and the second coating layer is less than 1:1, strong curl may be generated in a direction of the first coating layer, and if it is greater than 1:5, curl may be generated in a direction of the second coating layer, to the contrary. The curling is not preferable because it may cause poor sticking/adhesion with other devices, films, or layers contacted when the flexible film of the present invention is applied in other devices, films, layer, and the like. Thus, when the ratio of the thicknesses of the first coating layer and the second coating layer is within the above range, more optimized property in terms of processability can be secured.

Meanwhile, the first and the second coating layers may comprise additive commonly used in the art such as surfactant, a UV absorbent, a UV stabilizer, an anti-yellowing agent, a leveling agent, an antifoulant, dye for improving color index, and the like, in addition to the above explained binders, inorganic fine particles, a photoinitiator and an organic solvent. And, the content may be variously controlled within a range that does not deteriorate the properties of the coating layer of the present invention, and thus, is not specifically limited, but for example, the additives may be included in the content of about 0.01 to about 10 parts by weight, based on 100 parts by weight of the first and the second coating layers, respectively.

According to one embodiment of the present invention, for example, the first and the second coating layers may comprise surfactants as the additives, and the surfactant may be mono- or di-functional fluorine-containing acrylate, fluorine-containing surfactant or silicone-based surfactant. Wherein, the surfactant may be included while being dispersed or crosslinked in the first and the second coating layer.

And, the additives may include a UV absorbent or a UV stabilizer, and as the UV absorbent, a benzophenone-based compound, a benzotriazole-based compound, or a triazine-based compound, and the like may be mentioned, and as the UV stabilizer, tetramethyl piperidine, and the like may be mentioned.

The first and the second coating layers of the present invention may be formed by coating a coating composition comprising the above explained components on a substrate, and photocuring.

As the photoinitiator, 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, α,α-dimethoxy-α-phenyl acetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone diphenyl(2,4,6-trimethylbenzoyl)-phosphine oxide, or bis(2,4,6-trimethylbenzoyl)-phenylphosphine oxide, and the like may be mentioned, but not limited thereto. And, as the products currently commercially available, Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F, and the like may be mentioned. There photoinitiators may be used alone or in combinations of two or more different kinds.

As the organic solvent, an alcohol-based solvent such methanol, ethanol, isopropyl alcohol, or butanol, an alkoxy alcohol-based solvent such as 2-methoxyethanol, 2-ethoxyethanol, or 1-methoxy-2-propanol, a ketone-based solvent such acetone, methyl ethyl ketone, methyl isobutyl ketone, methyl propyl ketone, or cyclohexanone, and ether-based solvent such as propyleneglycol monopropyl ether, propyleneglycol monomethyl ether, ethyleneglycol monoethyl ether, ethyleneglycol monopropyl ether, ethyleneglycol monobutyl ether, diethyleneglycol monomethyl ether, diethylglycol monoethyl ether, diethylglycol monopropyl ether, diethylglycol monobutyl ether, or diethyleneglycol-2-ethylhexyl ether, an aromatic solvent such as benzene, toluene, or xylene, and the like may be used alone or in combinations.

The content of the organic solvent may be variously controlled within a range that does not deteriorate the properties of the coating layer, and is not specifically limited, but it may be included such that the weight ratio of solid contents : organic solvents may be about 30:70 to about 99:1, based on the solid contents in the components included in the coating composition. When the content of the organic solvent is within the above range, appropriate flowability and coatability may be exhibited.

The coating composition may be sequentially coated on the front side and the opposite side of the support substrate, or may be simultaneously coated on both sides of the support substrate.

According to one embodiment of the present invention, the flexible film of the present invention may be obtained by coating the composition comprising the above explained components on both side of the support substrate, and then, photocuring it to form a coating layer. Wherein, a method of coating the coating composition is not specifically limited as long as it may be used in the technical field to which the present invention pertains, and for example, bar coating, knife coating, roll coating, blade coating, die coating, micro gravure coating, comma coating, slot die coating, lip coating, solution casting, and the like may be used.

According to one embodiment of the present invention the flexible film of the present invention may further comprise one or more layers, membranes or films such as a plastic resin film, an adhesive film, a release film, a conductive film, a conductive layer, a liquid crystal layer, a coating layer, a cured resin layer, a non-conductive film, a metal mesh layer, or a patternized metal layer, between the upper side of at least one of the first and the second coating layers and the coating layer, or between a support substrate and the coating layer.

And, the layer, membrane or film may be in any shape of monolayer, bilayer or laminated type. The layer, membrane, or film may be deposited on the coating layer by lamination of a freestanding film using adhesive or an adhesive film, and the like, or by coating, deposition, sputtering, and the like, but the present invention is not limited thereto.

The flexible film of the present invention may be manufactured by the following method, for example.

According to one embodiment of the present invention, the flexible film may be formed by primary coating of a coating composition for the formation of a first coating layer on one side of a support substrate and primary photocuring, followed by secondary coating of a coating composition for the formation of a second coating layer on the other side, namely, on the opposite side of the support substrate and secondary photocuring.

In case a coating layer is formed by the above method, in the secondary photocuring step, UV irradiation is achieved on the opposite side rather than on a side on which the first coating composition is coated, and thus, curl that may be generated by cure shrinkage in the first photocuring step may be offset in an opposite direction, to obtain a flat flexible film. Thus, additional planarizing process is not required.

However, the present invention is not limited thereto, and curl balance may be also adjusted by simultaneously coating a coating composition on both sides of a support substrate and then curing.

The flexible film of the present invention exhibits excellent flexibility, bendability, high hardness, scratch resistance, high transparency, high durability and stability to bending, rolling or folding, and thus, may be used as the cover films of the next generation displays having bendable, flexible, rollable or foldable properties.

In the flexible film of the present invention, the pencil hardness of the first coating layer, when the first coating layer is scratched with a pencil under a load of 750 g, may be 6 H or more, or 7 H or more.

And, the flexible film of the present invention may exhibit excellent dynamic folding property such that a crack of 3 cm or more may not be generated, when 80 to 90 degree folding and unfolding of both sides of the flexible film against the bottom surface are repeated 100,000 times at room temperature, with a distance of 5 mm at the middle of the film, while the second coating layer is allowed to face the bottom.

And, the flexible film of the present invention may have light transmittance of 88.0% or more, or 90.0% or more, and haze of 1.5% or less, or 1.0% or less, or 0.5% or less.

Such a flexible film of the present invention may be utilized in various fields. For example, it may be used as touch panels of mobile communication terminals, smart phones, or tablet PC's in a curved, bendable, flexible, rollable or foldable shape, as well as a flat shape, and cover substrates or device substrates of various displays.

Hereinafter, the actions and the effects of the invention will be explained in more detail with reference to specific examples of the invention. However, these examples are presented only as the illustrations of the invention, and the scope of the right of the invention is not determined thereby.

EXAMPLE

Preparation Example of a Coating Composition
Preparation Example 1

10 parts by weight of timethylolpropane triacrylate (TMPTA), 30 parts by weight of pentaerythritol tetraacrylate (PETA), 20 parts by weight of dipentaerythritol pentacrylate (DPEPA), 40 parts by weight of silica particles(MEK-AC-2140z, manufactured by Nissan Chemical), 0.06 parts by weight of surfactant F477 (manufactured by Dainippon Ink and Chemicals, Inc.), 0.72 parts by weight of a photoinitiator of Irgacure127 (manufactured by Ciba), and 50 parts by weight of a solvent of Methyl Ethyl Ketone (Samchun Chemicals) were mixed to prepare a coating composition.

Preparation Examples 2 to 10

Coating composition were prepared with changing the kind and/or content of each component of Preparation Example 1, and each component and content of Preparation Examples 1 to 10 are summarized in the following Table 1.

Preparation Examples 11 to 14

Coating compositions were prepared with changing the kind and/or content of each component of Preparation Example 1.

When the cumulative particle size distributions of silica fine particles S1, S2, S2 added during the preparation were measured according to particle size by laser diffraction (measurement method: Dynamic laser scattering, Size distribution by number is calculated using the refractive indexes, viscosities and dielectric constants of a solvent in which the inorganic fine particles are dispersed, and inorganic fine particles, apparatus name: Malvern Zetasizer Nano-ZS90), 10% cumulative particle diameter was designated as d10, 50% cumulative particle diameter was designated as d50, and 90% cumulative particle diameter was designated as d90.

The silica fine particles S1(d10=17 nm, d50=22 nm, d90=28 nm, surface-modified with a methacrylate silane coupling agent) are dispersed to 50 wt % in n-BA(normal butyl acetate) (hereinafter, referred to as an S1 dispersion), the silane fine particles S2(d10=29 nm, d50=51 nm, d90=74 nm, surface-modified with an acrylate silane coupling agent) are dispersed to 30 wt % in MEK (hereinafter, referred to as an S2 dispersion), and the silica particles S3(d10=108 nm, d50=119 nm, d90=131 nm, surface-modified with an acrylate silane coupling agent) are dispersed to 40 wt % in MEK (hereinafter, referred to as an S3 dispersion).

Each component and content of Preparation Examples 11 to 14 are summarized in the following Table 2.

TABLE 1

|  | Preparation Example1 | Preparation Example2 | Preparation Example3 | Preparation Example 4 | Preparation Example5 | Preparation Example6 | Preparation Example7 | Preparation Example8 | Preparation Example9 | Preparation Example10 |
|---|---|---|---|---|---|---|---|---|---|---|
| TMPTA | 10 | 10 | 10 | 10 | 10 | 10 | 10 | 10 | 10 | 10 |
| PETA | 30 | 30 | 30 | 10 | 30 | 10 | 30 | 10 | 30 | 10 |
| DPEPA | 20 | 30 | 30 | 10 | 30 | 10 | 30 | 10 | 30 | 10 |
| TEGDA |  |  | 10 | 20 |  |  | 10 | 20 |  |  |
| TPGDA |  |  |  |  | 10 | 20 |  |  | 10 | 20 |
| PU3400 |  |  |  |  |  |  | 20 | 50 | 20 | 50 |
| TA-604AU |  |  | 20 | 50 | 20 | 50 |  |  |  |  |
| Silica | 40 | 30 |  |  |  |  |  |  |  |  |
| Surfactant | 0.06 | 0.07 | 0.10 | 0.10 | 0.10 | 0.10 | 0.10 | 0.10 | 0.10 | 0.10 |
| Photoinitiator | 0.72 | 0.84 | 1.21 | 1.21 | 1.21 | 1.21 | 1.21 | 1.21 | 1.21 | 1.21 |
| Methyl Ethyl Ketone | 50 | 50 | 30 | 30 | 30 | 30 | 30 | 30 | 30 | 30 |
| Modulus of elasticity (unit: MPa) | 1000 or more | 1000 or more | 950 | 500 | 850 | 600 | 800 | 300 | 700 | 280 |

TABLE 2

|  |  | Preparation Example 11 | Preparation Example 12 | Preparation Example 13 | Preparation Example 14 |
|---|---|---|---|---|---|
| TMPTA |  | 30 | 30 | 30 | 20 |
| MU9800 |  | 40 | 40 | 40 | 40 |
| MU9200 |  | 30 | 30 | 30 | 40 |
| Silica fine particle | S1 | 30 | 30 | 30 | 30 |
|  | S2 | 15 | 25 |  |  |
|  | S3 |  |  | 15 | 30 |
| Surfactant |  | 0.07 | 0.07 | 0.07 | 0.07 |
| Photoinitiator |  | 0.84 | 0.84 | 0.84 | 0.84 |
| MEK |  | 50 | 50 | 50 | 50 |
| Modulus of elasticity (MPa) |  | 1000 or more | 1000 or more | 1000 or more | 1000 or more |

* In the Tables 1 and 2, the moduli of elasticity of the first and second coating layers mean the values measured according to ASTM D882 while each coating layer is delaminated from the support substrate, and the property of each component is as follows:
TMPTA (trimethylolpropane triacrylate): Mw = 338 g/mol, acrylate equivalent weight = 113 g/mol
PETA (pentaerythritol tetraacrylate): Mw = 352 g/mol, acrylate equivalent weight = 88 g/mol
DPEPA (dipentaerythritol pentaacrylate): Mw = 525 g/mol, acrylate equivalent weight = 105 g/mol
TEGDA (triethyleneglycol diacrylate): Mw = 258 g/mol, acrylate equivalent weight = 129 g/mol
TPGDA (tripropyleneglycol diacrylate): Mw = 300 g/mol, acrylate equivalent weight = 150 g/mol
PU3400 (3-functional urethane acrylate-based compound): Mw = 2,500 g/mol, acrylate equivalent weight = 833 g/mol
TA-604AU (3-functional urethane acrylate-based compound): Mw = 2,300 g/mol, acrylate equivalent weight = 767 g/mol
MU9800 (9-functional urethane acrylate-based compound): Mw = 3,500 g/mol, acrylate equivalent weight: 389 g/mol
MU9020 (10- functional urethane acrylate-based compound): Mw = 4,500 g/mol, acrylate equivalent weight: 450 g/mol Preparation Example of a Flexible Film Example 1

The coating composition of Preparation Example 1 was coated on one side of a polyimide support substrate having a modulus of elasticity measured according to ASTM D882 of 6 GPa (size: 20 cm×20 cm, thickness: 50 μm) by bar coating, followed by photocuring with a metal halide lamp of 290-320 nm wavelength, to form a first coating layer (thickness: 30 μm).

The coating composition of Preparation Example 6 was coated on an opposite side of the support substrate, followed by photocuring by the same method, to form a second coating layer(thickness: 30 μm), thus manufacturing a flexible film.

Examples 2 to 5

Flexible films were manufactured by the same method as Example 1, except that the kind of the coating composition used in the second coating layer and/or the thickness of the coating layer in Example 1 were changed.

Comparative Examples 1 to 26

Flexible films were manufactured by the same method as Example 1, except that the kind of the coating composition used in the first coating layer and/or the thickness of the coating layer, or the kind of the coating composition used in the second coating layer and/or the thickness of the coating layer in Example 1 were changed.

The kinds of the coating compositions and the thicknesses of the coating layers in Examples 1 to 5 and Comparative Examples 1 to 42 were respectively summarized in the following Tables 3 to 5.

TABLE 3

|  | First coating layer | | Second coating layer | |
|---|---|---|---|---|
|  | Coating composition | Thickness (unit: μm) | Coating composition | Thickness (unit: μm) |
| Example 1 | Preparation Example 1 | 30 | Preparation Example 6 | 30 |
| Example 2 | Preparation Example 1 | 30 | Preparation Example 6 | 40 |
| Example 3 | Preparation Example 1 | 30 | Preparation Example 6 | 50 |
| Example 4 | Preparation Example 1 | 30 | Preparation Example 4 | 80 |
| Example 5 | Preparation Example 1 | 30 | Preparation Example 6 | 80 |

TABLE 4

|  | First coating layer | | Second coating layer | |
|---|---|---|---|---|
|  | Coating composition | Thickness (unit: μm) | Coating composition | Thickness (unit: μm) |
| Comparative Example 1 | Preparation Example 1 | 10 | Preparation Example 1 | 10 |
| Comparative Example 2 | Preparation Example 1 | 30 | Preparation Example 1 | 30 |

TABLE 4-continued

| | First coating layer | | Second coating layer | |
|---|---|---|---|---|
| | Coating composition | Thickness (unit: μm) | Coating composition | Thickness (unit: μm) |
| Comparative Example 3 | Preparation Example 2 | 10 | Preparation Example 2 | 10 |
| Comparative Example 4 | Preparation Example 2 | 30 | Preparation Example 2 | 30 |
| Comparative Example 5 | Preparation Example 3 | 10 | Preparation Example 3 | 10 |
| Comparative Example 6 | Preparation Example 3 | 30 | Preparation Example 3 | 30 |
| Comparative Example 7 | Preparation Example 4 | 10 | Preparation Example 4 | 10 |
| Comparative Example 8 | Preparation Example 4 | 30 | Preparation Example 4 | 30 |
| Comparative Example 9 | Preparation Example 1 | 10 | Preparation Example 5 | 20 |
| Comparative Example 10 | Preparation Example 1 | 10 | Preparation Example 5 | 30 |
| Comparative Example 11 | Preparation Example 1 | 10 | Preparation Example 5 | 40 |
| Comparative Example 12 | Preparation Example 1 | 10 | Preparation Example 5 | 50 |
| Comparative Example 13 | Preparation Example 1 | 10 | Preparation Example 6 | 20 |
| Comparative Example 14 | Preparation Example 1 | 10 | Preparation Example 6 | 30 |
| Comparative Example 15 | Preparation Example 1 | 10 | Preparation Example 6 | 40 |
| Comparative Example 16 | Preparation Example 1 | 10 | Preparation Example 6 | 50 |
| Comparative Example 17 | Preparation Example 1 | 30 | Preparation Example 5 | 20 |
| Comparative Example 18 | Preparation Example 1 | 30 | Preparation Example 5 | 30 |
| Comparative Example 19 | Preparation Example 1 | 30 | Preparation Example 5 | 40 |
| Comparative Example 20 | Preparation Example 1 | 30 | Preparation Example 5 | 50 |
| Comparative Example 21 | Preparation Example 1 | 30 | Preparation Example 3 | 80 |
| Comparative Example 22 | Preparation Example 1 | 30 | Preparation Example 5 | 80 |
| Comparative Example 23 | Preparation Example 1 | 30 | Preparation Example 7 | 80 |
| Comparative Example 24 | Preparation Example 1 | 30 | Preparation Example 8 | 80 |
| Comparative Example 25 | Preparation Example 1 | 30 | Preparation Example 9 | 80 |
| Comparative Example 26 | Preparation Example 1 | 30 | Preparation Example 10 | 80 |

TABLE 5

| | First coating layer | | Second coating layer | |
|---|---|---|---|---|
| | Coating composition | Thickness (unit: μm) | Coating composition | Thickness (unit: μm) |
| Comparative Example 27 | Preparation Example 1 | 30 | Preparation Example 11 | 30 |
| Comparative Example 28 | Preparation Example 1 | 30 | Preparation Example 12 | 30 |
| Comparative Example 29 | Preparation Example 1 | 30 | Preparation Example 13 | 30 |
| Comparative Example 30 | Preparation Example 1 | 30 | Preparation Example 14 | 30 |
| Comparative Example 31 | Preparation Example 1 | 30 | Preparation Example 11 | 80 |
| Comparative Example 32 | Preparation Example 1 | 30 | Preparation Example 12 | 80 |
| Comparative Example 33 | Preparation Example 1 | 30 | Preparation Example 13 | 80 |
| Comparative Example 34 | Preparation Example 1 | 30 | Preparation Example 14 | 80 |
| Comparative Example 35 | Preparation Example 2 | 30 | Preparation Example 11 | 30 |
| Comparative Example 36 | Preparation Example 2 | 30 | Preparation Example 12 | 30 |
| Comparative Example 37 | Preparation Example 2 | 30 | Preparation Example 13 | 30 |
| Comparative Example 38 | Preparation Example 2 | 30 | Preparation Example 14 | 30 |
| Comparative Example 39 | Preparation Example 2 | 30 | Preparation Example 11 | 80 |
| Comparative Example 40 | Preparation Example 2 | 30 | Preparation Example 12 | 80 |
| Comparative Example 41 | Preparation Example 2 | 30 | Preparation Example 13 | 80 |
| Comparative Example 42 | Preparation Example 2 | 30 | Preparation Example 14 | 80 |

<Experimental Example>
<Measurement Method>
1) Pencil Hardness

After traveling back and forth one time on the surface of the first coating layer at an angle of 45 degree under a load of 750 g according to JIS K5400-5-4, using a pencil hardness measuring instrument, the maximum hardness without scratch was confirmed.

2) Dynamic Folding (DF) Test

FIG. 1 schematically shows a method of conducting a dynamic folding test for a film according to one embodiment of the present invention.

Each film of Examples and Comparative Examples was laser-cut to a size of 80×140 mm so as to minimize fine cracks on the edge. The laser-cut film was put on a measuring instrument with the second coating layer facing the bottom surface, the interval at the folded part was adjusted to 5 mm, and the continuous operation of 80 to 90 degree folding and unfolding both sides of the film against the bottom surface (a speed at which the film is folded was 1.5 seconds per one time) was repeated at room temperature, and then, the maximum repeat number at which a crack of 3 cm or more was generated was measured.

In case a crack of 3 cm or more was not generated until the operation was repeated 100,000 times, the operation was not progressed any longer.

3) Curl Test

Each film of Examples and Comparative Examples was cut to a square of 10 cm×10 cm, and then, the external surface of a film curvature (curled surface) was put on the bottom of a test table, a distance of 4 edge points of the square from the bottom was measured, and the average of 4 points was calculated and indicated as curl number. In case the first coating layer is the inner side of curl, it was indicated as +Curl, and in case the second coating layer is the inner side of curl, it was indicated as −Curl.

4) Dent Test

Figure 2:
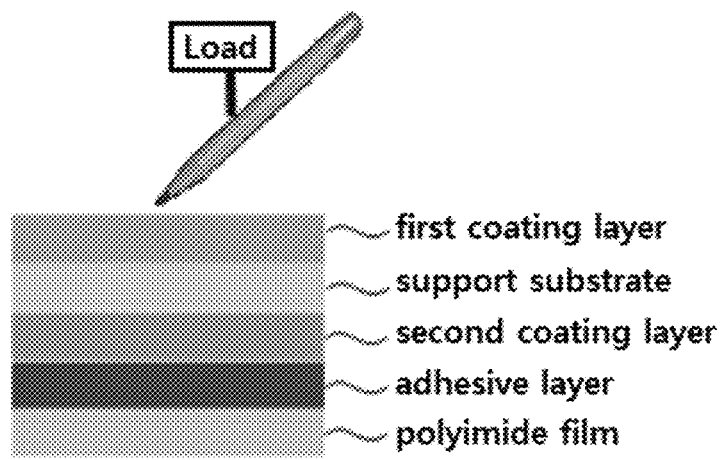
FIG. 2 schematically shows a method of conducting a dent test for a film according to one embodiment of the present invention.

FIG. 2 schematically shows a method of conducting a dent test for a film according to one embodiment of the preset invention.

For each film of Examples and Comparative Example, an adhesive layer(material: OCA, thickness; 25 μm) and a polyimide film(thickness 50 μm) were respectively laminated on the second coating layer. The laminated films were put on the bottom with the first coating layer facing the upper side.

After traveling back and forth one time on the surface of the first coating layer at an angle of 45 degree using a 3 H hardness pencil, while a load was added by 100 g starting from the load of 100 g, the maximum weight at which damage such as a press mark, and the like was not generated in all the layers was confirmed. In case damage was not generated until 1500 g, the operation was not progressed any longer.

The results of measuring the properties are shown in the following Tables 6 to 8.

TABLE 6

|  | Pencil hardness | DF test | Dent test | Curl test |
|---|---|---|---|---|
| Example 1 | 8H | 100k or more | 1500 g or more | +20 mm |
| Example 2 | 8H | 100k or more | 1500 g or more | +10 mm |
| Example 3 | 8H | 100k or more | 1500 g or more | +5 mm |
| Example 4 | 7H | 100k or more | 1500 g or more | 0 mm |
| Example 5 | 7H | 100k or more | 1500 g or more | 0 mm |

TABLE 7

|  | Pencil hardness | DF test | Dent test | Curl test |
|---|---|---|---|---|
| Comparative Example 1 | 9H | 0.1k or less | 300 g | 0 mm |
| Comparative Example 2 | 9H | 0.1k or less | 1500 g or more | 0 mm |
| Comparative Example 3 | 8H | 0.1k or less | 300 g | 0 mm |
| Comparative Example 4 | 8H | 0.1k or less | 1500 g or more | 0 mm |
| Comparative Example 5 | H | 100k or more | Less than 100 g | 0 mm |
| Comparative Example 6 | H | 100k or more | Less than 100 g | 0 mm |
| Comparative Example 7 | F | 100k or more | Less than 100 g | 0 mm |
| Comparative Example 8 | F | 100k or more | Less than 100 g | 0 mm |
| Comparative Example 9 | 4H | 100k or more | 400 g | +2 mm |
| Comparative Example 10 | 4H | 100k or more | 800 g | −5 mm |
| Comparative Example 11 | 3H | 100k or more | 1200 g | −10 mm |
| Comparative Example 12 | 3H | 100k or more | 1500 g or more | −15 mm |
| Comparative Example 13 | 3H | 100k or more | 800 g | +1 mm |
| Comparative Example 14 | 3H | 100k or more | 1200 g | −4 mm |
| Comparative Example 15 | 3H | 100k or more | 1500 g or more | −8 mm |
| Comparative Example 16 | 3H | 100k or more | 1500 g or more | −13 mm |
| Comparative Example 17 | 9H | 40k | 500 g | +25 mm |
| Comparative Example 18 | 9H | 60k | 1000 g | +15 mm |
| Comparative Example 19 | 8H | 50k | 1500 g or more | +8 mm |
| Comparative Example 20 | 8H | 40k | 1500 g or more | +4 mm |
| Comparative Example 21 | 8H | 20k | 1500 g or more | −3 mm |
| Comparative Example 22 | 8H | 30k | 1500 g or more | −2 mm |
| Comparative Example 23 | 8H | 70k | 1500 g or more | −2 mm |
| Comparative Example 24 | 4H | 100k or more | 1500 g or more | +6 mm |
| Comparative Example 25 | 7H | 80k | 1500 g or more | −1 mm |
| Comparative Example 26 | 3H | 100k or more | 1500 g or more | +6 mm |

TABLE 8

|  | Pencil hardness | DF test | Dent test | Curl test |
|---|---|---|---|---|
| Comparative Example 27 | 9H | 0.1k or less | 1500 g or more | −2 mm |
| Comparative Example 28 | 9H | 0.1k or less | 1500 g or more | −3 mm |
| Comparative Example 29 | 9H | 0.1k or less | 1500 g or more | −2 mm |
| Comparative Example 30 | 9H | 0.1k or less | 1500 g or more | −5 mm |
| Comparative Example 31 | 9H | 0.1k or less | 1500 g or more | −32 mm |
| Comparative Example 32 | 9H | 0.1k or less | 1500 g or more | −37 mm |
| Comparative Example 33 | 9H | 0.1k or less | 1500 g or more | −33 mm |
| Comparative Example 34 | 9H | 0.1k or less | 1500 g or more | −42 mm |
| Comparative Example 35 | 9H | 0.1k or less | 1500 g or more | −4 mm |
| Comparative Example 36 | 9H | 0.1k or less | 1500 g or more | −6 mm |
| Comparative Example 37 | 9H | 0.1k or less | 1500 g or more | −4 mm |
| Comparative Example 38 | 9H | 0.1k or less | 1500 g or more | −8 mm |
| Comparative Example 39 | 9H | 0.1k or less | 1500 g or more | −34 mm |
| Comparative Example 40 | 9H | 0.1k or less | 1500 g or more | −40 mm |
| Comparative Example 41 | 9H | 0.1k or less | 1500 g or more | −38 mm |
| Comparative Example 42 | 9H | 0.1k or less | 1500 g or more | −46 mm |

Referring to Tables 6 to 8, the films of the present invention were good in terms of all the properties, and particularly, exhibited high hardness of 7 H or more, and excellent flexibility and impact resistance in the dynamic folding test, dent test and curl test. Meanwhile, the films of Comparative Examples had lowered pencil hardness, or failed to exhibit flexibility and impact resistance suitable for a flexible film.

What is claimed is:
1. A flexible film comprising:
   a support substrate;
   a first coating layer on one side of the support substrate, comprising a first crosslinked copolymer in which one or more kinds of different tri- to penta-functional acrylate-based binders are crosslinked, and inorganic fine particles; and
   a second coating layer on an opposite side of the support substrate, comprising a second crosslinked copolymer in which at least one tri- to penta-functional acrylate-based binder, at least one difunctional acrylate-based binder, and at least one tri-functional urethane acrylate-based binder are crosslinked,
   wherein the first coating layer and the second coating layer contact the support substrate, wherein a modulus of elasticity of the second coating layer, as measured according to ASTM D882 while the second coating layer is delaminated from the support substrate, is 500 to 600 MPa, wherein a thickness of the first coating layer is 20 to 30 μm and a thickness of the second coating layer is 20 to 150 μm, and a ratio of the thicknesses of the first coating layer and the second coating layer is 1:1 to 1:5, wherein the first coating layer has a pencil hardness of at least 6H under a load of 750 g, and wherein the flexible film has a dynamic folding property such that a crack of 3 cm or more is not generated when 80 to 90 degree folding and unfolding of both sides of the flexible film against a mandrel with a diameter of 5 mm are repeated 100,000 times at room temperature while the second coating layer is disposed to face outside.

2. The flexible film according to claim 1, wherein the difunctional acrylate-based binder includes one or more selected from the group of triethylene glycol acrylate (TEGDA), tetraethylene glycol diacrylate(TTEGDA), tripropylene glycol diacrylate(TPGDA), dipropylene glycol diacrylate(DPGDA), polyethylene glycol diacrylate (PEGDA), ethoxylated neopentyl glycol diacrylate (NPEOGDA), propoxylated neopentyl glycol diacrylate(N-PPOGDA), diethylene glycol diacrylate(DEGDA), butanediol diacrylate(BDDA) and hexanediol diacrylate (HDDA).

3. The flexible film according to claim 1, wherein an acrylate equivalent weight of the tri to penta-functional acrylate-based binder is 50 to 300 g/mol.

4. The flexible film according to claim 1, wherein an equivalent weight of the tri-functional urethane acrylate-based binder is 100 to 10,000 g/mol.

5. The flexible film according to claim 1, wherein the inorganic fine particles are silica fine particles, aluminum oxide particles, titanium oxide particles, zirconium oxide particles, or zinc oxide particles.

6. The flexible film according to claim 1, wherein the first coating layer comprises 40 to 80 parts by weight of the first crosslinked copolymer, and 20 to 60 parts by weight of the inorganic fine particles.

7. The flexible film according to claim 1, wherein the second crosslinked copolymer comprises 20 to 80 parts by weight of the tri- to penta-functional acrylate-based binder, 10 to 40 parts by weight of the difunctional acrylate-based binder, and 10 to 70 parts by weight of the tri-functional urethane acrylate-based binder.

8. The flexible film according to claim 1, wherein the thickness of the second coating layer is 30 to 120 μm.

9. The flexible film according to claim 1, wherein the support substrate includes one or more selected from the group consisting of polyimide(PI), polyimideamide, polyamide(PA), polyetherimide(PEI), polyethyleneterephtalate (PET), polyethylenenaphthalate(PEN), polyetheretherketon (PEEK), cyclic olefin polymer(COP), polyacrylate(PAC), polymethylmethacrylate(PMMA), and triacetylcellulose (TAC).

10. The flexible film according to claim 1, wherein the first coating layer has a pencil hardness of at least 7H under a load of 750 g.

11. The flexible film of claim 1, wherein the tri- to penta-functional acrylate-based binder is trimethylolpropane triacrylate(TMPTA), trimethylolpropane ethoxy triacrylate(TMPEOTA), glycerin propoxylated triacrylate (GPTA), pentaerythritol tetraacrylate(PETA), or dipentaerythritol pentacrylate(DPEPA).

12. The flexible film according to claim 1, wherein the inorganic fine particles have a nanoscale particle diameter.

* * * * *